(12) United States Patent
Ide (10) Patent No.: US 7,832,950 B2
(45) Date of Patent: Nov. 16, 2010

(54) IRIS DIAPHRAGM MECHANISM

(75) Inventor: Takayuki Ide, Fussa (JP)

(73) Assignee: Olympus Corporation, Tokyo (JP)

( * ) Notice: Subject to any disclaimer, the term of this patent is extended or adjusted under 35 U.S.C. 154(b) by 278 days.

(21) Appl. No.: 12/032,172

(22) Filed: Feb. 15, 2008

(65) Prior Publication Data

US 2008/0199177 A1    Aug. 21, 2008

(30) Foreign Application Priority Data

Feb. 21, 2007    (JP)    ............................. 2007-040462

(51) Int. Cl.
*G03B 9/02*    (2006.01)
(52) U.S. Cl. ...................................... 396/510; 396/505
(58) Field of Classification Search ......... 396/505–510, 396/170, 257, 458; 359/227, 739–740
See application file for complete search history.

(56) References Cited

U.S. PATENT DOCUMENTS

| | | | | |
|---|---|---|---|---|
| 1,302,359 A | * | 4/1919 | Garbutt | ................. 396/510 |
| 1,678,119 A | * | 7/1928 | Klein | .................... 396/458 |
| 3,136,236 A | * | 6/1964 | Hartl | ..................... 396/510 |
| 3,715,965 A | * | 2/1973 | Alfredsson | ............ 396/509 |
| 5,926,663 A | * | 7/1999 | Suzuki | .................. 396/449 |
| 5,999,752 A | * | 12/1999 | Ueyama et al. | ........ 396/213 |
| 6,867,932 B2 | * | 3/2005 | Noguchi | ............... 359/739 |
| 2004/0240879 A1 | * | 12/2004 | Negishi et al. | ........ 396/505 |
| 2006/0033974 A1 | * | 2/2006 | Sato | ..................... 359/227 |

FOREIGN PATENT DOCUMENTS

| | | |
|---|---|---|
| EP | 1 591 828 A2 | 11/2005 |
| FR | 2 621 681 A1 | 4/1989 |
| JP | 2003-005248 | 1/2003 |
| JP | 2004-37861 | 2/2004 |
| WO | WO 97/05423 | 2/1997 |

* cited by examiner

*Primary Examiner*—W. B. Perkey
*Assistant Examiner*—Warren K Fenwick
(74) *Attorney, Agent, or Firm*—Scully, Scott, Murphy & Presser, P.C.

(57) ABSTRACT

A fixed aperture and a fixed shaft are formed in a fixed member. A drive shaft is formed in a driving member. A fixed shaft hole and a drive shaft hole are formed in a plurality of diaphragm blades, and the plurality of blades is connected to the fixed shaft and the drive shaft. An aperture diameter of a variable aperture AP which is an aperture zone formed by the plurality of diaphragm blades is controlled by rotating relatively the driving member with respect to the fixed member. Here, the diaphragm blades are disposed in a plurality of layers, and a part of) the diaphragm blades belonging to an adjacent layer are disposed to be overlapping with respect to an optical axis direction.

8 Claims, 10 Drawing Sheets

IRIS DIAPHRAGM MECHANISM

CROSS-REFERENCE TO RELATED APPLICATION

The present application is based upon and claims the benefit of priority from the prior Japanese Patent Application No. 2007-040462 filed on Feb. 21, 2007; the entire contents of which are incorporated herein by reference.

BACKGROUND OF THE INVENTION

1. Field of the Invention

The present invention relates to an iris diaphragm mechanism.

2. Description of the Related Art

A diaphragm mechanism used in a conventional image pickup optical system is provided with a rotation axis which is a center of rotation of a diaphragm blade, and a drive shaft for driving the diaphragm blade. Moreover, a cam mechanism etc. for driving a plurality of diaphragm blades simultaneously has been used. Furthermore, a structure is such that a diaphragm blade adjacent to another diaphragm blade overlaps one by one. A structure proposed in Japanese Patent Application Laid-open Publication No. 2003-5248 is an example of such structure.

The structure proposed in Japanese Patent Application Laid-open Publication No. 2003-5248 includes a fixed member in which a fixed aperture is formed, and a plurality of diaphragm blades which are opened and closed pivotably with fixed shafts disposed in plurality around the fixed aperture. Moreover, at least a part of the diaphragm blades are provided with an extension shaped portion for maintaining an order of overlapping in an optical axis direction, with the other diaphragm blade. Accordingly, a shape is let to be such that a front-end portion of the diaphragm blade does not overlap with another diaphragm blade at a completely closed position.

When a structure in which the diaphragm blades overlap one after the other as in the conventional technology is adopted, with narrowing of the diaphragm blades, it is required to be deformed such that the diaphragm blade is bent. Therefore, a force which drives the drive shaft is increased.

In a diaphragm mechanism of comparatively large equipments such as a camera and a projector, an amount of bending of the diaphragm blade is also small. Moreover, an actuator having a substantial generative force can be used as an actuator for moving the drive shaft. Therefore, an increase in a force which moves such drive shaft has never been a problem.

However, from here onward, in a diaphragm mechanism which is used in a portable camera and extremely small image pickup equipment in which an application of a diaphragm mechanism is expected, it is necessary to make the diaphragm mechanism small. Moreover, in a portable camera and extremely small image pickup equipment, an actuator for driving the drive shaft is restricted to be a very small size actuator.

Whereas, from a point of a light shielding capacity, a thickness of certain degree has to be secured for the diaphragm blade. For this, in small size image pickup equipment, an amount of distortion at the time of bending the diaphragm blade is increased extremely. When the amount of distortion of the diaphragm blade increases, a frictional force of the diaphragm blades also increases.

In a small actuator which is used in the small size image pickup equipment, it is difficult to generate a substantial driving force. Consequently, an increase in a force which moves the drive shaft of the diaphragm blades with a substantial amount of distortion exerts a substantial load on a small size actuator. Moreover, when the amount of distortion of the diaphragm blade is increased, a damage caused to the diaphragm blade is also substantial.

SUMMARY OF THE INVENTION

The present invention is made in view of the abovementioned circumstances, and an object of the present invention is to provide an iris diaphragm mechanism which is capable of driving diaphragm blades by a small driving force.

To solve the abovementioned issues, and to achieve the object, according to the present invention, there can be provided an iris diaphragm mechanism including a fixed member, a driving member which is displaced with respect to the fixed member, a plurality of diaphragm blades, a transmitting member which transmits a driving force from the driving member to the diaphragm blades, and a shaft member which is a shaft having a relative displacement with respect to the fixed member, of the diaphragm blades, and the diaphragm blades are displaced with the shaft member as an axis, upon receiving a motion of the driving member, which is transmitted via the transmitting member, and the iris diaphragm mechanism controls an area of an aperture zone which is formed by the diaphragm blades, and each plane in which the adjacent diaphragm blades are displaced, differs in an optical axis direction.

Moreover, according to a preferable aspect of the present invention, it is desirable that a fixed aperture and a fixed shaft are formed in the fixed member, and a drive shaft is formed in a driving member, and a fixed shaft hole and a drive shaft hole are formed in the plurality of diaphragm blades, and the plurality of diaphragm blades are connected to the fixed shaft and the drive shaft, and an aperture zone which is formed by the plurality of diaphragm blades is controlled by turning around relatively the driving member with respect to the fixed member, and the diaphragm blades are disposed in a plurality of layers, and a part of the diaphragm blades belonging to an adjacent layer are disposed to be overlapping with respect to the optical axis direction.

Moreover, according to a preferable aspect of the present invention, it is desirable that from among the plurality of diaphragm blades, the diaphragm blades which are provided in the same layer do not overlap mutually.

Moreover, according to a preferable aspect of the present invention, it is desirable that a space maintaining member which regulates a space between the layers is formed between the layers of the diaphragm blades.

Moreover, according to a preferable aspect of the present invention, it is desirable that when the number of diaphragm blades belonging to the same layer from among the plurality of layers is let to be m, and the number of layers is let to be n, the diaphragm blades of each layer are disposed upon rotating by $360°/(m \times n)$ with respect to the optical axis.

DETAILED DESCRIPTION OF THE INVENTION

Exemplary embodiments of an iris diaphragm mechanism according to the present invention will be described below by referring to the accompanying diagrams. However, the present invention is not restricted to the embodiments described below.

First Embodiment

Figure 1:
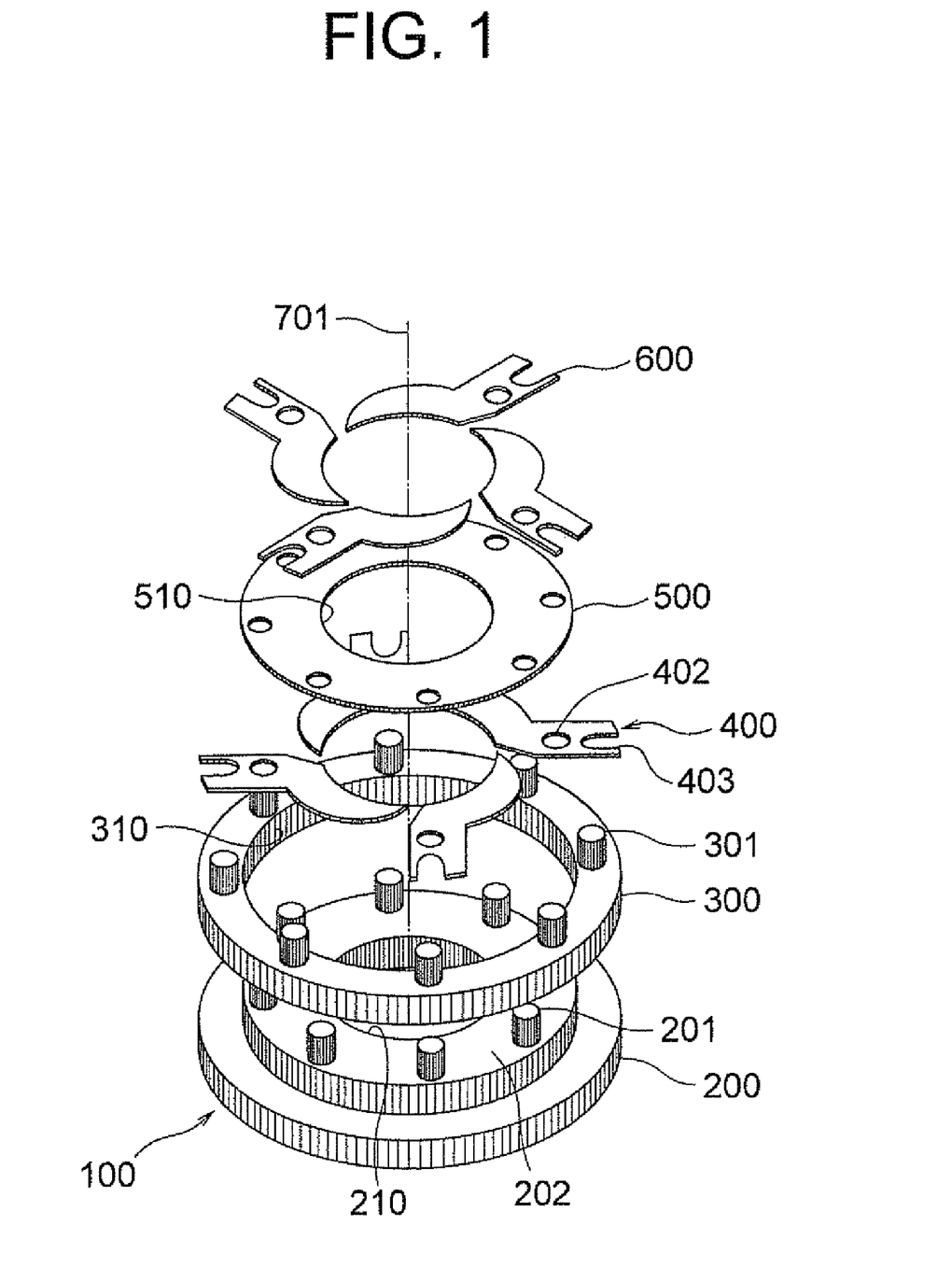
FIG. 1 is an exploded perspective view of an iris diaphragm mechanism according to a first embodiment of the present invention.
Figure 2:
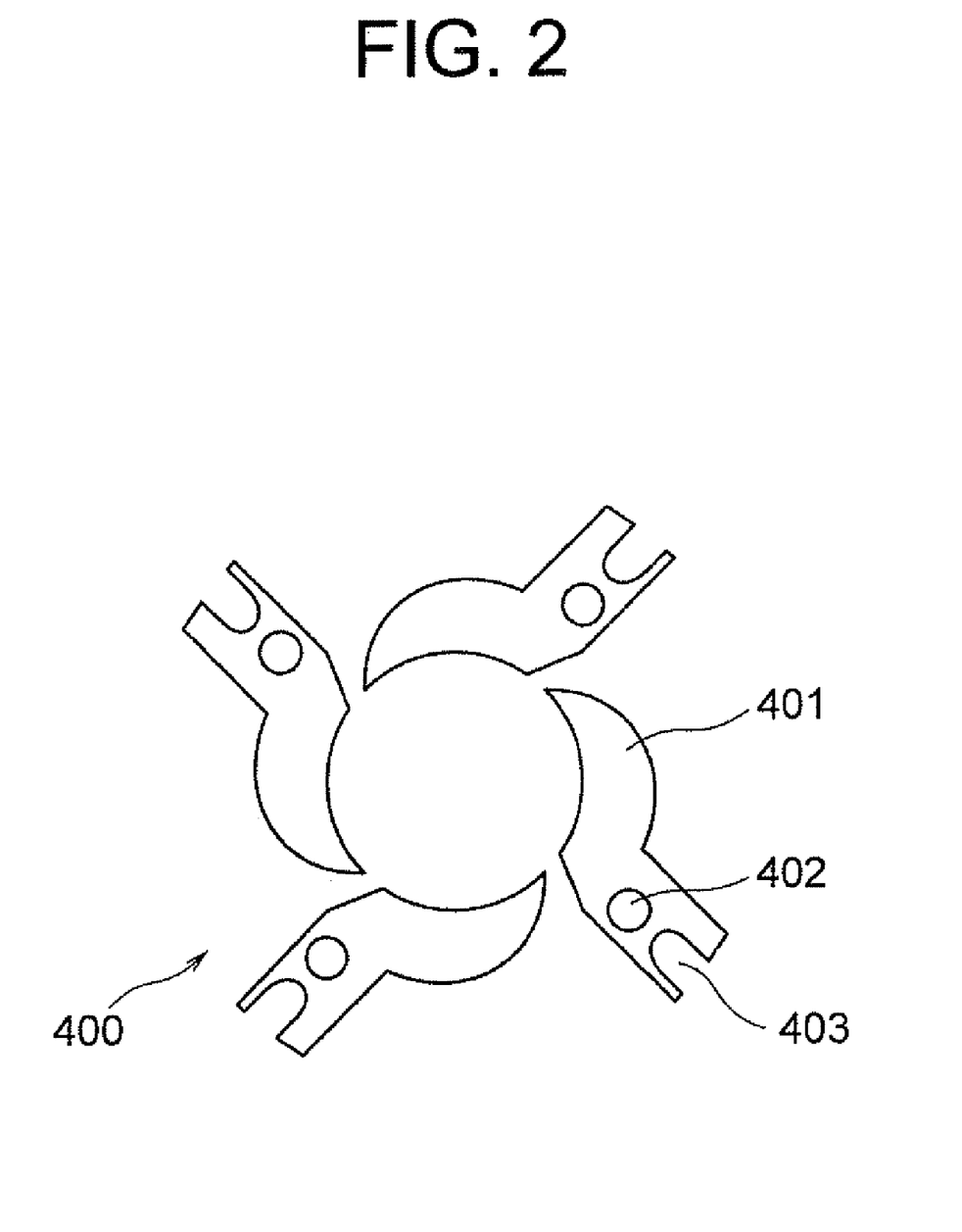
FIG. 2 is a diagram showing a structure of diaphragm blades in the first embodiment.
Figure 3:
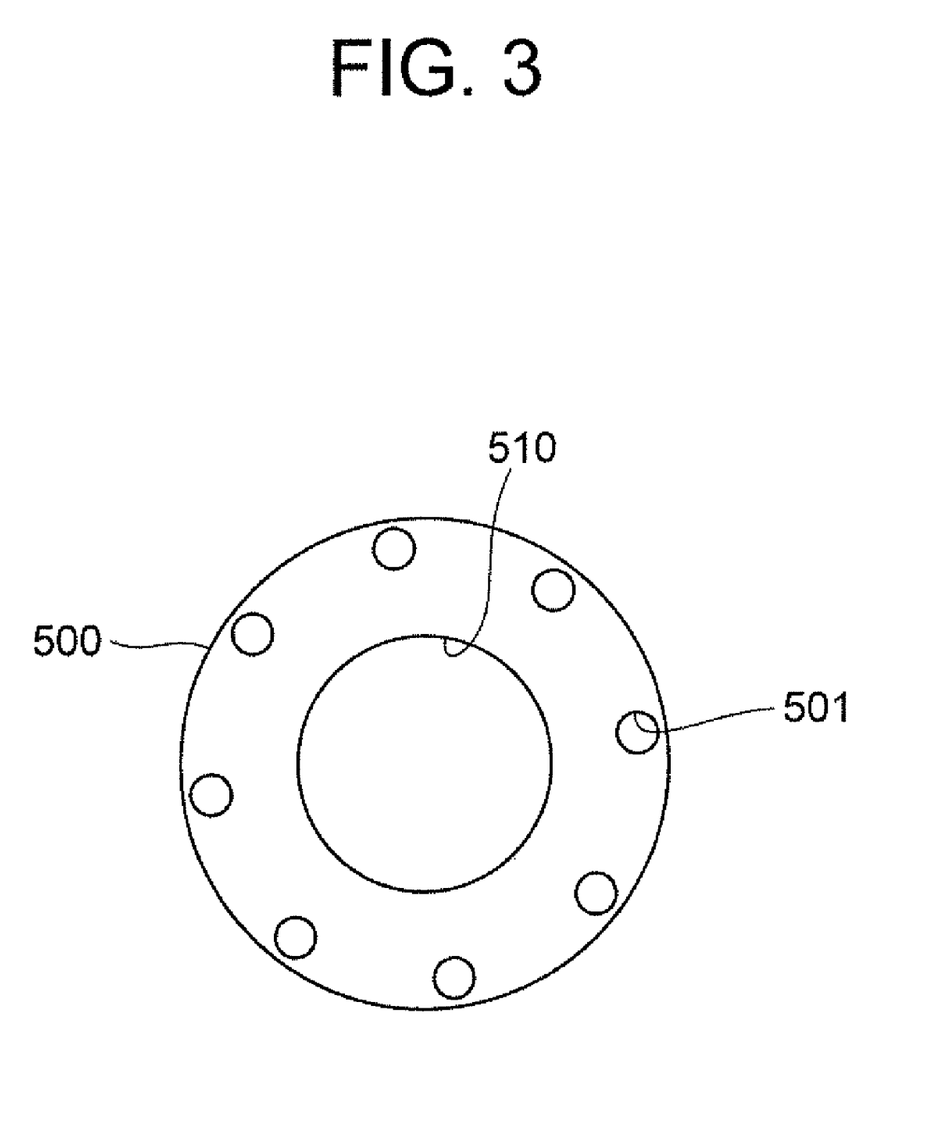
FIG. 3 is a diagram showing a structure of an interference preventing member in the first embodiment.
Figure 4:
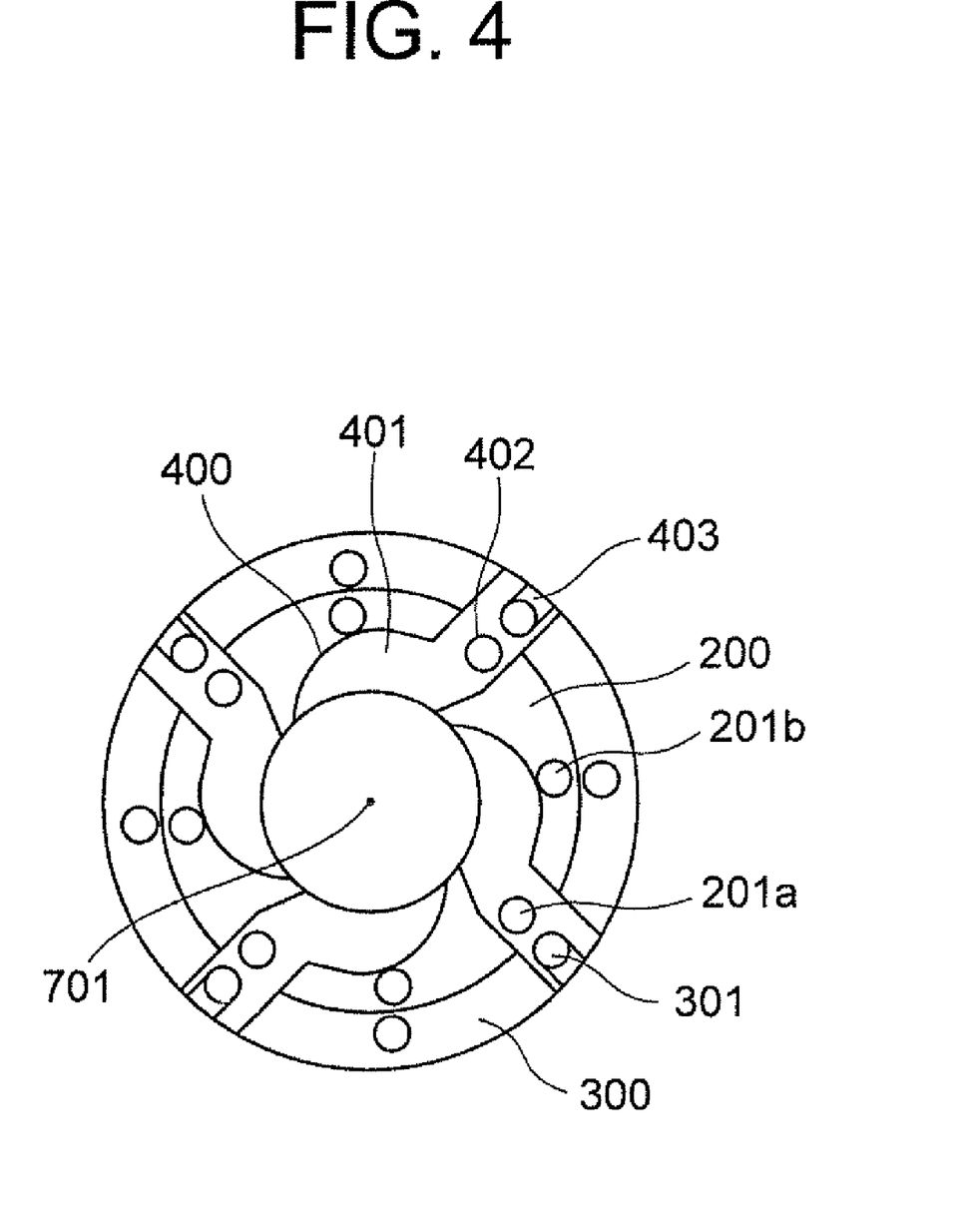
FIG. 4 is a top view of a fixed member, a driving member, and the diaphragm blades in an assembled state in the first embodiment.
Figure 5:
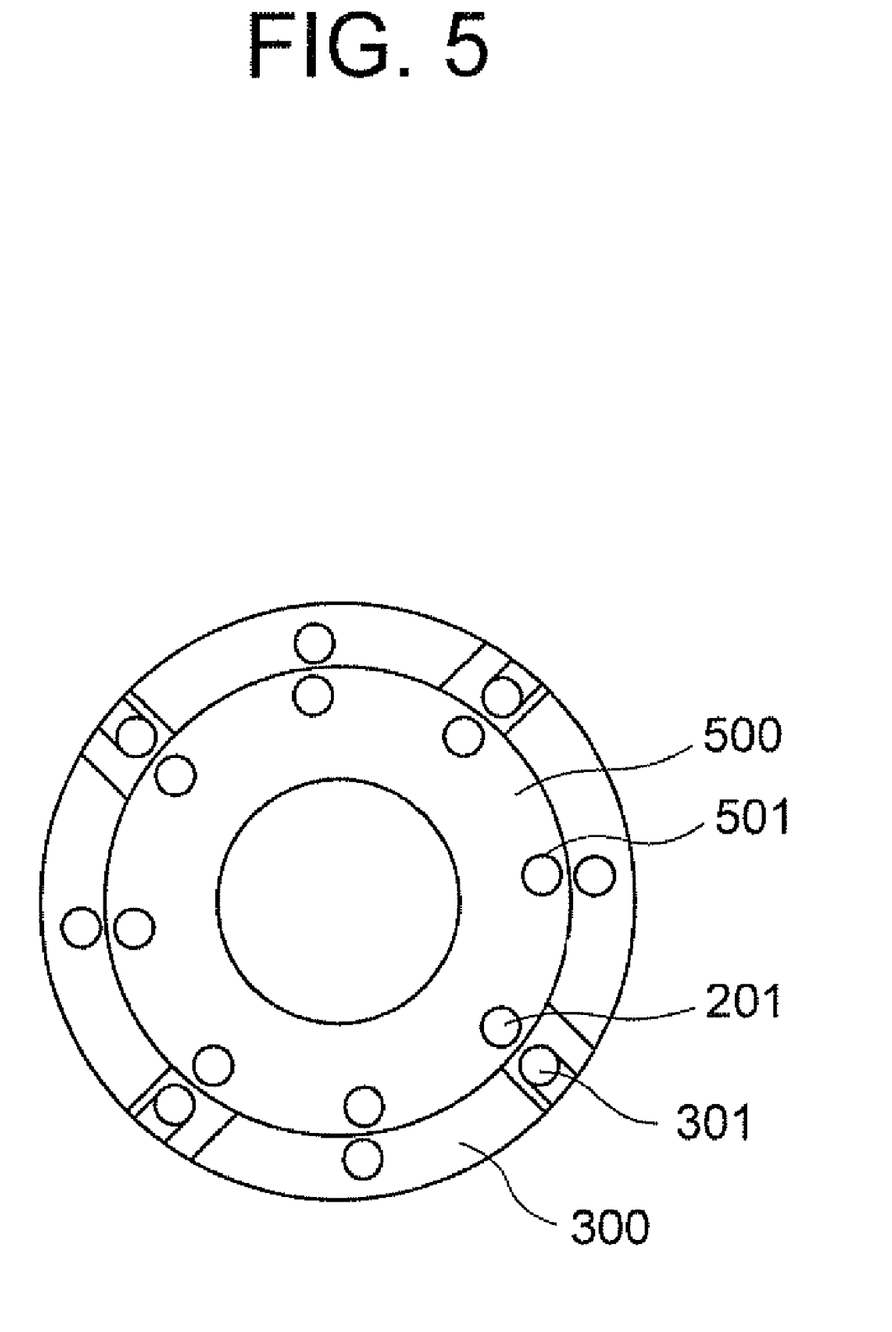
FIG. 5 is a top view of the fixed member, the driving member, the diaphragm blades, and the interference preventing member in an assembled state in the first embodiment.
Figure 6:
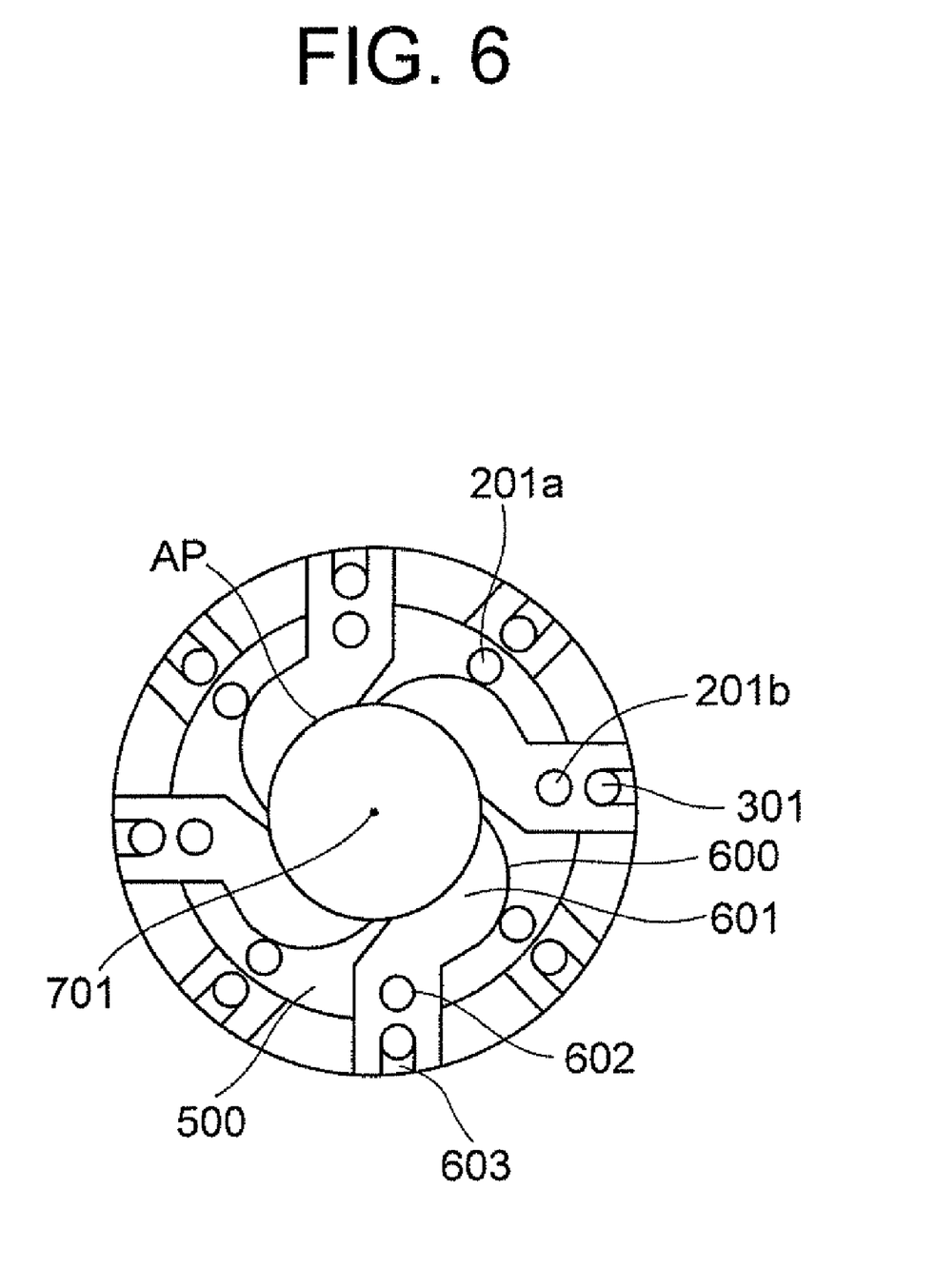
FIG. 6 is a top view showing a state of an aperture with a maximum diameter, in the first embodiment.

An iris diaphragm mechanism 100 according to a first embodiment of the present invention will be described below by referring to FIG. 1 to FIG. 6. FIG. 1 is an exploded perspective view of the first embodiment. FIG. 2 is a detail diagram of diaphragm blades. FIG. 3 is a detail diagram of an interference preventing member. FIG. 4, FIG. 5, and FIG. 6 are diagrams showing each of the components in an assembled state. In the present embodiment, for simplifying the description, description of an actuator for driving a driving member, a connecting mechanism which connects the actuator and the driving member, and a fastener for preventing each of the components from being separated is omitted.

Firstly, a structure of a diaphragm mechanism will be described by using FIG. 1. As shown in FIG. 1, the iris diaphragm mechanism 100 includes a fixed member 200 having a plurality of fixed shafts 201, a driving member 300 having a plurality of drive shafts 301, diaphragm blades 400 and 600 which regulate a state of an aperture having a light shielding capacity, and an interference preventing member 500.

The fixed member 200 has a hollow circular cylindrical shape having a fixed aperture 210. The fixed member 200 is formed in steps of concentric circles, and a step portion 202 which is centrally positioned is formed to be thicker than a step portion which is positioned at a periphery. Hereinafter, a center of the fixed aperture 210 (hollow circle) is let to be an optical axis 701. Moreover, on a surface of the step portion 202 which is placed at a center of the fixed member 200, eight fixed shafts 201 are formed at an interval angle of 45 degrees with respect to the optical axis 701.

Moreover, the driving member 300 has a hollow circular cylindrical shape. A diameter of a fixed aperture 310 of the hollow cylindrical shape of the driving member 300 is same as a diameter of an outer circumference of the step portion 202 which is placed at the center of the fixed member 200. Moreover, the driving member 300 is formed such that a thickness of the driving member 300 is same as a height of the step portion 202 which is placed at the center of the fixed member 200.

Moreover, eight drive shafts 301 are formed at an interval of 45 degrees with respect to the optical axis 701. By forming the fixed member 200 and the driving member 300 in such manner, it is possible to engage the fixed member 200 and the driving member 300. Furthermore, it is possible to make the driving member 300 to be relatively rotatable with respect to the fixed member 300.

Four diaphragm blades 400 having the same shape are disposed in the same layer, at an interval angle of 90 degrees with respect to the optical axis 701. Moreover, similarly as the diaphragm blades 400, four diaphragm blades 600 having the same shape are disposed in the same layer, at an interval angle of 90 degrees with respect to the optical axis 701. Furthermore, the diaphragm blades 400 and the diaphragm blades 600 are disposed upon mutually rotating by 45 degrees with respect to the optical axis 701.

Moreover, the interference preventing member 500 is disposed between the diaphragm blades 400 and the diaphragm blades 600.

Next, details of the diaphragm blades will be described by using FIG. 2. As shown in FIG. 2, the diaphragm blade 400 has a light shielding portion 401 having a light shielding capacity, which regulates an aperture shape, a fixed shaft hole 402 which is engaged with the fixed shaft 201, and is a center of rotation at the time of narrowing the diaphragm blades 400, and a drive shaft hole 403 which is engaged with the drive shaft 301 and receives a driving force for narrowing the diaphragm blades 400. Since a drive shaft position changes at the time of narrowing the diaphragm blades 400, the drive shaft hole 403 is formed to be notch shaped in the first embodiment.

Next, details of the interference preventing member 500 will be described below by referring to FIG. 3. As shown in FIG. 3, the interference preventing member 500 has a fixed aperture 510 having a hollow circular cylindrical shape. Fixed holes 501 which are engaged with the fixed shafts 201 are formed in the interference preventing member 500. An outer diameter of the interference preventing member 500 is same as an outer diameter of the step portion 202 which is positioned at the center of the fixed member 200. Moreover, an inner diameter of the interference preventing member 500 is formed to be same as a diameter of the hollow cylindrical shaped fixed aperture 210 of the fixed member 200.

Next, an assembled state of each component will be described below by using FIG. 4, FIG. 5, and FIG. 6. FIG. 4 shows a top view of the fixed member 200, the driving member 300, and the diaphragm blades 400 in an assembled state.

As shown in FIG. 4, the fixed shaft hole 402 formed in the diaphragm blade 400 is engaged with the fixed shaft 201 formed on the fixed member 200. The drive shaft hole 403 is engaged with the drive shaft 301 formed on the driving member 300.

Here, as in the diaphragm blade 400, the diaphragm blades 400 in the same layer do not have an overlapping portion. The light shielding portion 401 of the diaphragm blade 400 engaged with a fixed shaft 201a is formed not to interfere with a fixed shaft 201b.

FIG. 5 is a diagram showing a top view of a state in which, the interference preventing member 500 is further assembled on an assembly state in FIG. 4. As shown in FIG. 5, the fixed holes 501 formed in the interference preventing member 500 are engaged with the fixed shafts 201 formed on the fixed member 200. Moreover, the interference preventing member 500 is formed to have a thickness less than a thickness of the diaphragm blades 400 and 600. The interference preventing member 500 regulates a space between the layers of the diaphragm blades 400 and 600. The interference preventing member 500 corresponds to a space maintaining member.

FIG. 6 is a diagram showing a top view of a state in which, the diaphragm blades 600 are further assembled on an assembly state in FIG. 5. As shown in FIG. 6, a fixed shaft hole 602 formed in the diaphragm blade 600 is engaged with the fixed shaft 201 formed on the fixed member 200. Moreover, a drive shaft hole 603 is engaged with the drive shaft 301 formed on the driving member 300.

Here, as in the diaphragm blade 600, the diaphragm blades 600 in the same layer do not have an overlapping portion. A light shielding portion 601 of the diaphragm blade 600 engaged with the fixed shaft 201*b* is formed not to interfere with the fixed shaft 201*a*.

Next, an operation of the diaphragm mechanism according to the first embodiment will be described below by referring to FIG. 6 and FIG. 7. FIG. 6 is a top view showing a state of an aperture with a maximum diameter in the first embodiment. Moreover, FIG. 7 is a top view showing a state of an aperture when narrowed.

As shown in FIG. 6, when the diameter of the aperture is maximum, it is desirable that the variable aperture AP which is formed by the diaphragm blades 400 and 600, the fixed aperture 510 which is made by a hollow circle of the interference preventing member 500, and the fixed aperture 210 which is made by the hollow circular cylinder of the fixed member 200 satisfy the following conditions.

diameter of variable aperture AP≦diameter of fixed aperture 510 diameter of variable aperture AP≦diameter of fixed aperture 210

Figure 7:
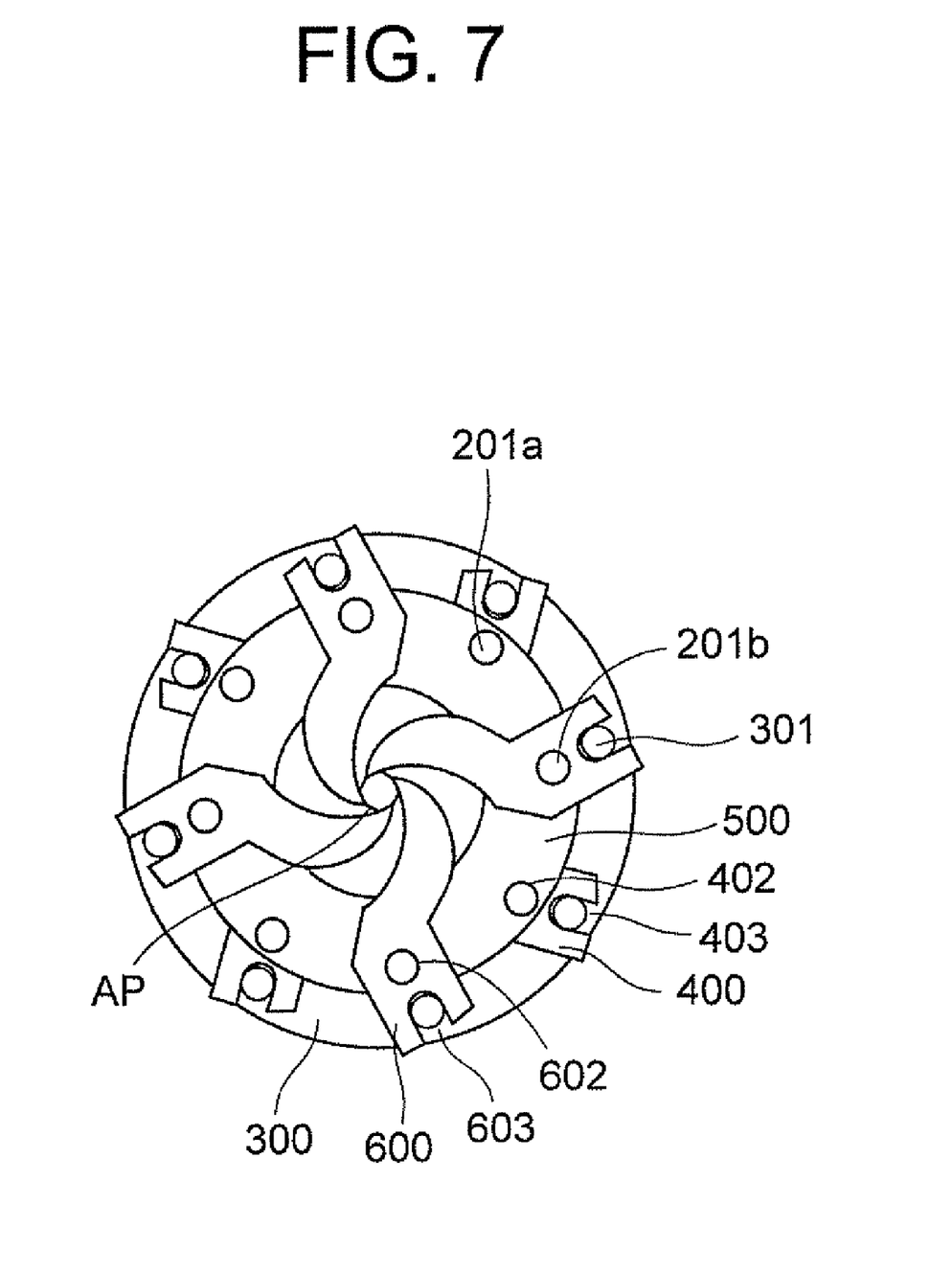
FIG. 7 is a top view showing a state of an aperture when narrowed, in the first embodiment.

Next, as shown in FIG. 7, the driving member 300 rotates relatively with respect to the fixed member 200. Accordingly, the drive shafts 301 are engaged with the drive shaft holes 403 and 603 of the diaphragm blades 400 and 600. Therefore, the diaphragm blades 400 and 600 rotate around the fixed shaft 201 as a center of rotation.

Along with this operation, the light shielding portion 401 of the diaphragm blade 400 and the light shielding portion 601 of the diaphragm blade 600 block the fixed aperture 510 made by the hollow circle of the interference preventing member 500 and the fixed aperture 210 made by the hollow circular cylinder of the fixed member 200.

Moreover, a final aperture shape is regulated by the variable aperture AP which is made by the diaphragm blades 400 and 600. It is possible to control an aperture diameter of the variable aperture AP (aperture shape) by an amount of rotation with respect to an aperture center of the driving member 300.

At this time, a predetermined space is secured between the diaphragm blades 400 and the diaphragm blades 600 by the interference preventing member 500. Therefore, the diaphragm blades 400 and diaphragm blades 600 are prohibited from being engaged. As a result, it is possible to prevent the rotation of the diaphragm blades 400 and the diaphragm blades 600 from being obstructed. Consequently, it is possible to make as small as possible an area in which the light shielding portion 401 of the diaphragm blade 400 and the light shielding portion 601 of the diaphragm blade 600 overlap with respect to the direction of the optical axis 701, in a range in which no gap is developed.

In this manner, in the first embodiment, the fixed apertures 210 and the fixed shafts 201 are formed in the fixed member 200. The drive shafts 301 are formed in the driving member 300. The fixed shaft holes 402 and 602 and the drive shaft holes 403 and 603 are formed in the plurality of diaphragm blades 400 and 600, and are engaged with the fixed shafts 201 and the drive shafts 301. Moreover, the aperture diameter of the variable aperture AP which is the aperture zone formed by the plurality of diaphragm blades 400 and 600 is controlled by rotating relatively the driving member 300 with respect to the fixed member 200. Here, the diaphragm blades 400 and 600 are disposed in a plurality of layers and a portion of the diaphragm blades belonging to the adjacent layer are disposed to be mutually overlapping, with respect to the direction of the optical axis 701.

Moreover, the diaphragm blades 400 belonging to the same layer are disposed at the same angle with respect to the optical axis 701. Furthermore, the diaphragm blades 400 and 600 in each layer are disposed upon rotating through a predetermined angle with respect to the optical axis 701. Moreover, when the number of diaphragm blades belonging to the same layer from among the plurality of layers is let to be m, and the number of layers is let to be n, the diaphragm blades of each layer are disposed upon rotating by 360°/(m×n), with respect to the optical axis 701.

In the first embodiment, the number of diaphragm blades belonging to the same layer from among the plurality of layers is 4 (m=4), and the number of layers is 2 (n=2). Therefore, the diaphragm blades of each layer are disposed upon rotating by 360°/(4×2)=45°, with respect to the optical axis 701.

According to such structure, in the first embodiment, at the time of narrowing the diaphragm blades, there is no deformation whatsoever in the diaphragm blades. Therefore, there is no increase in the driving force. Moreover, a force required for driving the diaphragm blades is of a level of a frictional force which is generated in the components. Accordingly, it is possible to decrease a generative force of an actuator which drives the driving member. Consequently, it is possible to make the actuator a small size actuator.

Moreover, in the first embodiment, the diaphragm blades are let to have a two-layered structure, and the number of diaphragm blades per layer is four. However, without restricting to this, the structure may be let to be a three or more layered structure. Furthermore, the structure may be let to be such that the number of diaphragm blades per layer is other than four.

Moreover, when it is possible to prevent the diaphragm blades 400 and 600 from being engaged by taking a substantial a portion of overlapping of the diaphragm blades 400 and 600 with respect to the optical axis, it is possible to omit the interference preventing member 500.

Moreover, the interference preventing member 500 is not involved in shielding light. Therefore, it is desirable to form the interference preventing member 500 by a member which is as thin as possible.

Moreover, the fixed member 200 and the driving member 300 are names in which states of relatively changing mutual positional relationship is expressed conveniently. Conveniently, it does not mean a member which is absolutely fixed with respect to a component other than a diaphragm such as a lens frame on which the diaphragm is mounted, or a member which drives.

Moreover, in the first embodiment, the fixed shafts 201 are formed on the fixed member 200. Furthermore, the drive shafts 301 are formed on the driving member 300. The fixed shaft hole 402 and the drive shaft hole 403 are formed in the diaphragm blades 400.

Figure 8:
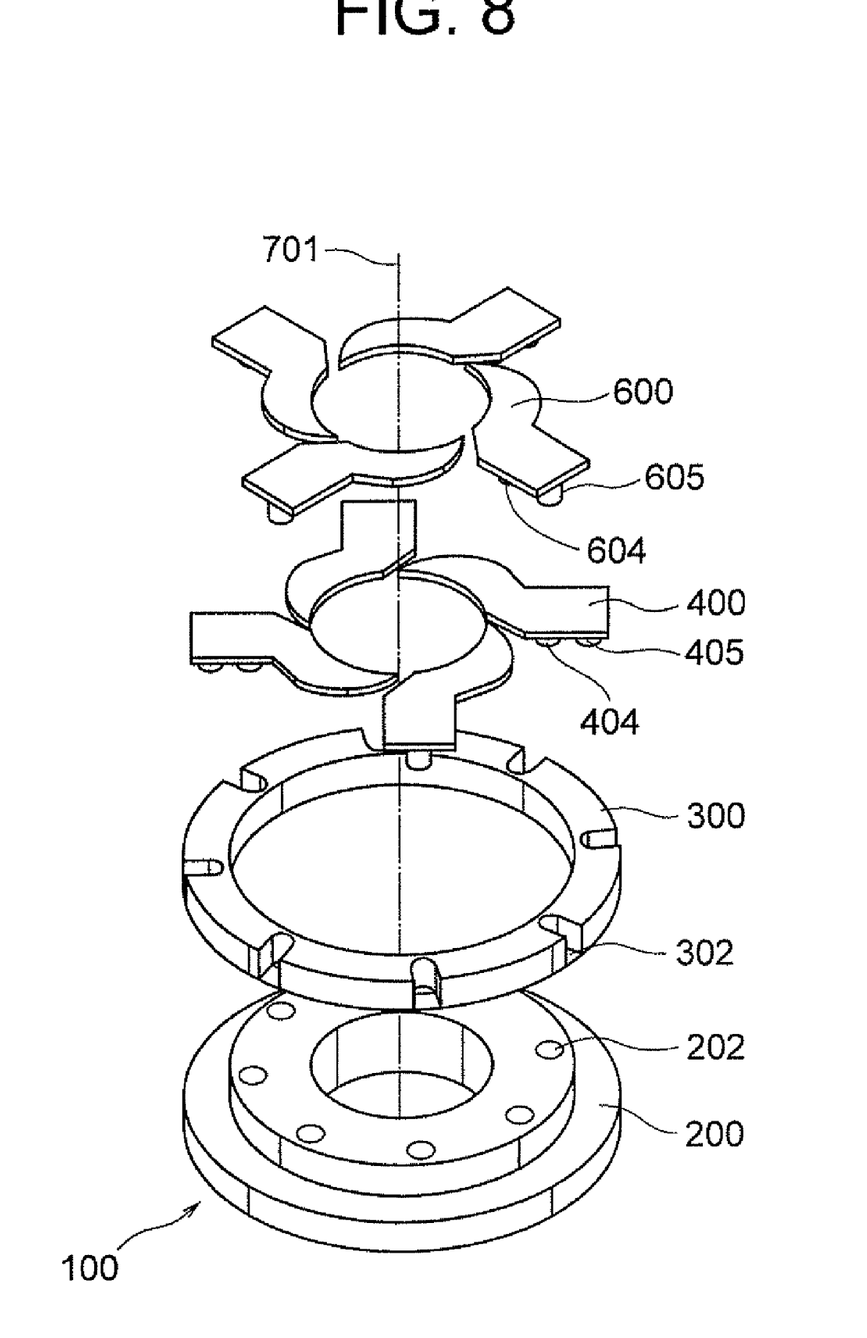
FIG. 8 is an exploded perspective view of a first modified embodiment.

However, the present invention is not restricted to such structure, and as shown in FIG. 8, the fixed shaft holes 202 and the drive shaft holes 302 may be formed in the fixed member 200 and the driving member 300. At this time, not a structure in which the diaphragm blades 400 and 600, fixed shafts 404 and 604, and drive shafts 405 and 605 are formed, but a structure in which, structural positions of fixed shafts, drive shafts, fixed shaft holes, and drive shaft holes formed a fixed member, a driving member to be formed on and in a fixed member, a driving member, and diaphragm blades are selected arbitrary also works.

Second Embodiment

Next, an iris diaphragm mechanism 150 according to a second embodiment of the present invention will be described below. Same reference numerals are assigned to components which are same as in the first embodiment, and the description to be repeated is omitted.

Figure 9:
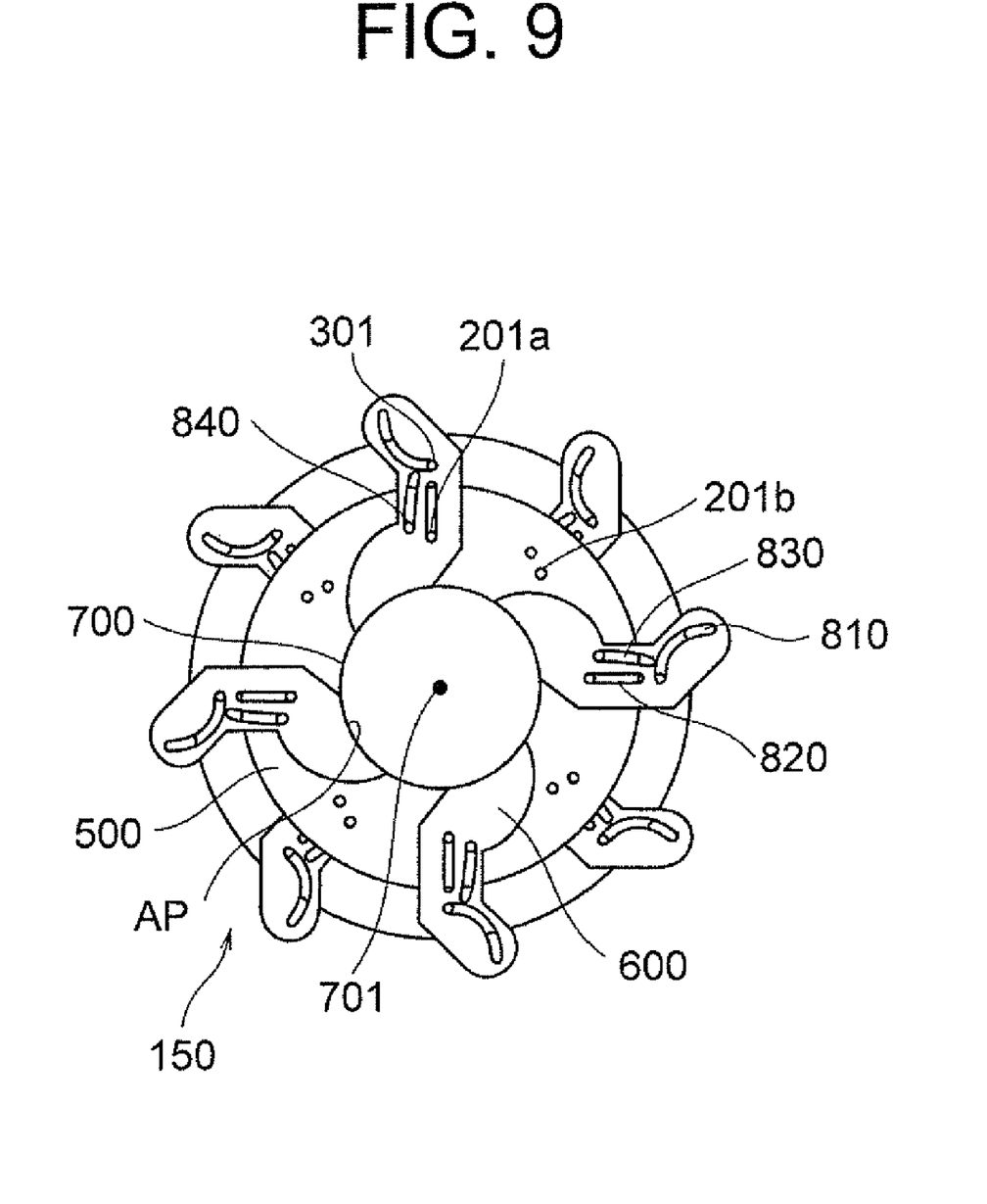
FIG. 9 is a top view showing a state of an aperture with a maximum diameter in a second embodiment of the present invention.
Figure 10:
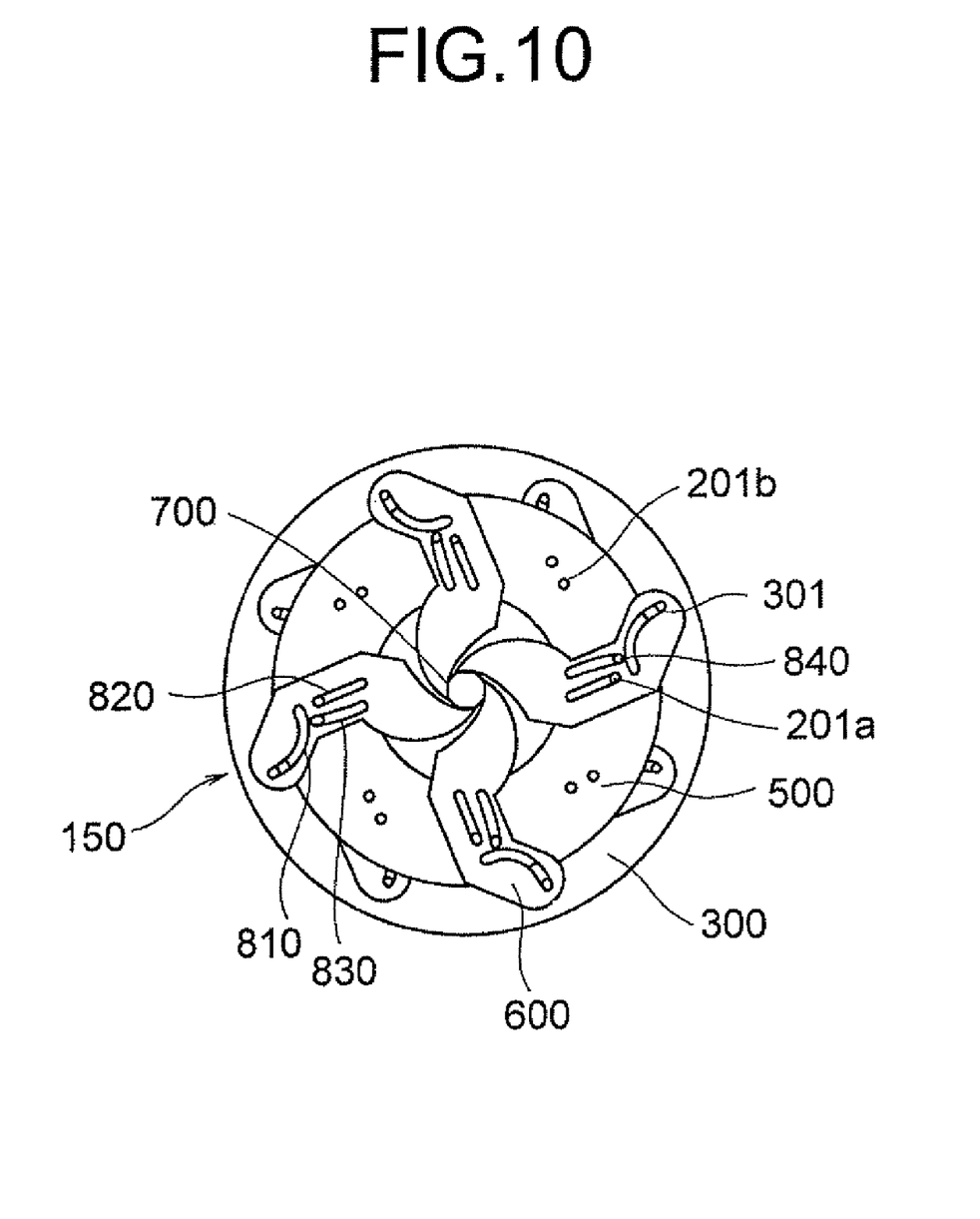
FIG. 10 is a top view showing a state of the aperture when narrowed, in the second embodiment.

FIG. 9 is a top view showing a state of an aperture with a maximum diameter in a second embodiment. Moreover, FIG. 10 is a top view showing a state of the aperture when narrowed. In the second embodiment, a plurality of drive shaft grooves 810 is formed in the diaphragm blades 400 and 600. Moreover, the driving member 300 is rotated relatively with respect to the fixed member 200. At this time, the drive shafts 301 make a contact with the drive shaft grooves 810 formed in the diaphragm blades 400 and 600.

The diaphragm blades 400 and 600 rotate around the fixed shaft 201 as a center. Simultaneously, since drive shaft grooves 820 are formed, the diaphragm blades 400 and 600 are regulated by the fixed shaft 201a, and are translated along the drive shaft groove 820.

In the second embodiment, according to such structure, the diaphragm blades 400 and 600 are allowed to make a rototranslational motion, and a size, in other words, an amount of opening of the variable aperture AP is controlled.

Here, with the drive shafts 301, the fixed shafts 201, and the drive shaft grooves 810 and 820, there is a possibility that the diaphragm blades 400 and 600 might be rotated around the drive shafts 301 as a center. Therefore, a regulating pin 840 is provided on the fixed member 200. Furthermore, a guide groove 830 following a desired trajectory is provided to displace the diaphragm blades 400 and 600 in a desired trajectory.

Accordingly, it is possible to regulate a rotational motion component of the diaphragm blades 400 and 600. As a result, by the regulating pin 840 moving along the guide groove 830, the diaphragm blades 400 and 600 are displaced to describe the desired trajectory.

By making a structure as shown in FIG. 9 and FIG. 10, the diameter of the variable aperture AP may be controlled by allowing the diaphragm blades 400 and 600 to undergo the rototranslation. In such manner, 'movement' in the present invention is a concept which includes rotation and straight advancement.

Moreover, as another example of a structure, one diaphragm blade (n=1) may be formed (provided) in each layer, and the number of layers may be let to be 8 (m=8). In this manner, the present invention may have various modified embodiments which fairly fall within the basic teaching herein set forth.

As it has been described above, the iris diaphragm mechanism according to the present invention is useful for driving diaphragm blades by a small driving force.

What is claimed is:

1. An iris diaphragm mechanism comprising:
a fixed member;
a driving member which is displaced with respect to the fixed member;
a plurality of diaphragm blades;
a transmitting member which transmits a driving force from the driving member to the diaphragm blades; and
a shaft member which is a shaft having a relative displacement with respect to the fixed member, of the diaphragm blades, wherein the diaphragm blades are displaced with the shaft member as an axis, upon receiving a motion of the driving member, which is transmitted via the transmitting member, and the iris diaphragm mechanism controls an area of an aperture zone which is formed by three or more diaphragm blades, and each plane in which adjacent diaphragm blades are displaced differs in an optical axis direction.

2. The iris diaphragm mechanism according to claim 1, wherein
when the number of diaphragm blades belonging to the same layer from among the plurality of layers is let to be m, and the number of layers is let to be n,
the diaphragm blades of each layer are disposed upon rotating by $360°/(m \times n)$ with respect to the optical axis.

3. The iris diaphragm mechanism according to claim 1, wherein
a fixed aperture and a fixed shaft are formed in the fixed member, and
a drive shaft is formed in a driving member, and
a fixed shaft hole and a drive shaft hole are formed in the plurality of diaphragm blades, and the plurality of diaphragm blades are connected to the fixed shaft and the drive shaft, and
an aperture zone which is formed by the plurality of diaphragm blades is controlled by turning around relatively the driving member with respect to the fixed member, and
the diaphragm blades are disposed in a plurality of layers, and
a part of the diaphragm blades belonging to an adjacent layer are disposed to be overlapping with respect to the optical axis direction.

4. The iris diaphragm mechanism according to claim 3, wherein
when the number of diaphragm blades belonging to the same layer from among the plurality of layers is let to be m, and the number of layers is let to be n,
the diaphragm blades of each layer are disposed upon rotating by $360°/(m \times n)$ with respect to the optical axis.

5. The iris diaphragm mechanism according to claim 3, wherein from among the plurality of diaphragm blades, the diaphragm blades which are provided in the same layer do not overlap mutually.

6. The iris diaphragm mechanism according to claim 5, wherein
when the number of diaphragm blades belonging to the same layer from among the plurality of layers is let to be m, and the number of layers is let to be n,
the diaphragm blades of each layer are disposed upon rotating by $360°/(m \times n)$ with respect to the optical axis.

7. The iris diaphragm mechanism according to any one of claims 1 to 5, wherein a space maintaining member which regulates a space between the layers is formed between the layers of the diaphragm blades.

8. The iris diaphragm mechanism according to claim 7, wherein
when the number of diaphragm blades belonging to the same layer from among the plurality of layers is let to be in, and the number of layers is let to be n,
the diaphragm blades of each layer are disposed upon rotating by $360°/(m \times n)$ with respect to the optical axis.

* * * * *